United States Patent
Nagayama et al.

(10) Patent No.: US 10,858,293 B2
(45) Date of Patent: Dec. 8, 2020

(54) ZIRCONIA SINTERED BODY AND MANUFACTURING METHOD OF THE SAME

(71) Applicant: TOSOH CORPORATION, Yamaguchi (JP)

(72) Inventors: Hitoshi Nagayama, Yamaguchi (JP); Hajime Funakoshi, Yamaguchi (JP); Hiroyuki Fujisaki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 16/369,289

(22) Filed: Mar. 29, 2019

(65) Prior Publication Data

US 2019/0300438 A1 Oct. 3, 2019

(30) Foreign Application Priority Data

Mar. 30, 2018 (JP) .................................. 2018-69383

(51) Int. Cl.
*C04B 35/488* (2006.01)
*C04B 35/645* (2006.01)

(52) U.S. Cl.
CPC ........ *C04B 35/4885* (2013.01); *C04B 35/645* (2013.01); *C04B 2235/3217* (2013.01); *C04B 2235/3246* (2013.01); *C04B 2235/3263* (2013.01); *C04B 2235/3277* (2013.01); *C04B 2235/656* (2013.01); *C04B 2235/763* (2013.01); *C04B 2235/9661* (2013.01)

(58) Field of Classification Search
CPC .................... C04B 358/4885; C04B 35/645
See application file for complete search history.

(56) References Cited

U.S. PATENT DOCUMENTS

| | | | | |
|---|---|---|---|---|
| 7,871,950 B2* | 1/2011 | Nakasuga | ............ | C01G 53/006 501/105 |
| 8,357,474 B2* | 1/2013 | Narendar | ............. | C04B 35/645 429/465 |
| 2010/0167170 A1* | 7/2010 | Narendar | ............. | C04B 35/488 429/495 |
| 2013/0284065 A1 | 10/2013 | Nahas | | |

FOREIGN PATENT DOCUMENTS

| | | |
|---|---|---|
| JP | 2004-059374 | 2/2004 |
| JP | 2005-306678 | 11/2005 |
| JP | 2011-020879 | 2/2011 |
| JP | 2013-126933 | 6/2013 |
| JP | 2014-501692 | 1/2014 |
| JP | 2017-160108 | 9/2017 |
| JP | 2017-160109 | 9/2017 |

* cited by examiner

*Primary Examiner* — Karl E Group
(74) *Attorney, Agent, or Firm* — Greenblum & Bernstein, P.L.C.

(57) ABSTRACT

A zirconia sintered body contains aluminum, cobalt, and manganese and a remaining portion consisting of yttria-containing zirconia. In an oxide exchange, aluminum content is 5.0 wt % or more and 30.0 wt % or less, cobalt content is 0.1 wt % or more and 2.0 wt % or less, and manganese content is 0.5 wt % or more and 7.0 wt % or less.

6 Claims, 2 Drawing Sheets
(2 of 2 Drawing Sheet(s) Filed in Color)

ZIRCONIA SINTERED BODY AND MANUFACTURING METHOD OF THE SAME

CROSS-REFERENCE TO RELATED APPLICATIONS

The present application claims priority under 35 U.S.C. § 119 of Japanese Application No. 2018-069383, filed on Mar. 30, 2018, the disclosure of which is expressly incorporated by reference herein in its entirety.

BACKGROUND OF THE INVENTION

1. Field of the Invention

The present disclosure is related to a zirconia sintered body. More specifically, the present disclosure is related to a zirconia sintered body exhibiting a gray color imparting a profound impression.

2. Description of Related Art

Compared to a zirconia sintered body having alumina content about 1 wt %, the zirconia sintered body having higher alumina content is known for excellent mechanical properties. The zirconia sintered body containing a large amount of alumina exhibits a white color, and therefore, coloring the sintered body by containing a colorant such as a lanthanoid rare-earth oxide, a transition metal, and the like has been considered (see Japanese Translation of PCT International Application No. 2014-501692, and Japanese Patent Laid-open Publication Nos. 2004-059374 and 2005-306678, for example). The zirconia sintered body exhibiting a gray color is considered because the color tone has a high versatility.

Up to this point, in order to color in gray color the zirconia sintered body having high alumina content, for example, a zirconia sintered body containing, as a colorant, zircon (into which cobalt and nickel are solid-dissolved) (Japanese Patent Laid-open Publication No. 2011-020879), a zirconia sintered body containing, as a colorant, cobalt aluminate of 0.01 wt % or more and 0.5 wt % or less (Japanese Patent Laid-open Publication No. 2013-126933), and a zirconia sintered body having alumina content of 5.0 wt % or more and 30.0 wt % or less and containing cobalt, zinc, and iron (Japanese Patent Laid-open Publication No. 2017-160108) are disclosed.

Alumina exceeding a certain amount exists as crystal grains in the sintered body, which serves as the colorant exhibiting a white color. Accordingly, the color tone of the zirconia sintered body having a high alumina content tends to be white and bright. In a case where the alumina content is about 1 wt %, the zirconia sintered body exhibits a dark gray color (Japanese Patent Laid-open Publication No. 2017-160109). However, a zirconia sintered body having high alumina content (the alumina content being 5 wt % or more, for example) exhibits a bright gray color despite of containing a colorant (Japanese Patent Laid-open Publication Nos. 2011-020879, 2013-126933, and 2017-160108). A gray color with a decreased brightness is sought in a decorative application for imparting a profound impression. However, zirconia sintered bodies exhibiting gray colors that have been reported up to now had only a low alumina content.

SUMMARY OF THE INVENTION

In view of the above, the present disclosure provides a zirconia sintered body exhibiting a gray color imparting a profound impression despite containing a large amount of alumina.

The inventors considered a zirconia sintered body exhibiting a gray color. As a result, the inventors discovered that a zirconia sintered body having a certain limited composition exhibits a gray color imparting a profound impression despite containing a large amount of alumina. Moreover, the inventors discovered that such a zirconia sintered body can be reproduced as a sintered body having a similar color tone even when being manufactured repeatedly with variation in a sintering temperature at the time of manufacturing the zirconia sintered body, for example.

Specifically, the present disclosure may be summarized as follows.

[1] The zirconia sintered body containing aluminum, cobalt, and manganese and a remaining portion consisting of yttria-containing zirconia. In an oxide exchange, aluminum content is 5.0 wt % or more and 30.0 wt % or less, cobalt content is 0.1 wt % or more and 2.0 wt % or less, and manganese content is 0.5 wt % or more and 7.0 wt %/i or less.

[2] The zirconia sintered body according to [1] noted above has yttria content in the yttria-containing zirconia of 2.0 mol % or more and less than 6.0 mol %.

[3] The zirconia sintered body according to one of [1] and [2] noted above includes an aluminum oxide and a composite oxide that contains aluminum, cobalt, and manganese having a spinel structure.

[4] The zirconia sintered body according to any one of [1] to [3] noted above in which a lightness L*, a hue a*, and a hue b* in an L*a*b* color system fulfill the following:

Lightness L*: 60 or less
Hue a*: $-1.5 \leq a^* \leq 1.5$, and
Hue b*: $-2.0 \leq b^* \leq 2.0$.

[5] A manufacturing method of zirconia sintered body according to any one of [1] to [4] noted above includes a molding process and a sintering process. The molding process molds a powder composition containing, in the oxide exchange, aluminum of 5.0 wt % or more and 30.0 wt % or less, cobalt of 0.1 wt % or more and 2.0 wt % or less, and manganese of 0.5 wt % or more and 7.0 wt % or less; and a remaining portion consisting of yttria-containing zirconia. The sintering process sinters a green body obtained in the molding process at a temperature of 1350° C. or more and 1550° C. or less.

[6] A powder composition containing, in the oxide exchange, aluminum of 5.0 wt % or more and 30.0 wt % or less, cobalt of 0.1 wt % or more and 2.0 wt % or less, and manganese of 0.5 wt % or more and 7.0 wt % or less; and a remaining portion consisting of yttria-containing zirconia.

The present disclosure provides a zirconia sintered body exhibiting a gray color imparting a profound impression despite of containing a large amount of alumina.

BRIEF DESCRIPTION OF THE DRAWINGS

The patent or application file contains at least one drawing executed in color. Copies of this patent or patent application publication with color drawing(s) will be provided by Office upon request and payment of the necessary fee.

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, a zirconia sintered body according to the present disclosure is described with an exemplary embodiment of the zirconia sintered body.

The zirconia sintered body of the present embodiment (hereafter, referred to as a "sintered body of the present embodiment") has yttria-containing zirconia as a main phase (matrix). The yttria functions as a stabilizer with little effect on a color tone of zirconia. Yttria content in the yttria-containing zirconia is preferably 2.0 mol % or more and less than 6.0 mol %, more preferably 2.0 mol % or more and 5.0 mol % or less, and still more preferably 2.6 mol % or more and 3.4 mol % or less.

The yttria content is a molar ratio (mol %) of yttria to a total of zirconia ($ZrO_2$) and yittria ($Y_2O_3$).

Aluminum content is 5.0 wt % or more and 30.0 wt % or less, preferably 8.0 wt % or more and 30.0 wt % or less, more preferably 10.0 wt % or more and 25.0 wt % or less less, more preferably 11.0 wt % or more and 25.0 wt % or less, and more preferably 13.0 wt % or more and 23.0 wt % or less. With the aluminum content within the above noted range, the sintered body includes at least crystal grains of alumina ($Al_2O_3$).

Cobalt content is 0.1 wt % or more and 2.0 wt % or less, and preferably 0.2 wt % or more and 1.8 wt/o or less.

Manganese content is 0.5 wt % or more and 7.0 wt %/o or less, and preferably 0.8 wt % or more and 6.0 wt % or less.

The content of each element of aluminum, cobalt, and manganese is a ratio of an oxide exchange weight (wt %) of each component to the sintered body weight, respectively. The oxide exchange of aluminum, cobalt, and manganese are $Al_2O_3$, $Co_3O_4$, and $Mn_3O_4$, respectively.

The content of yttria-containing zirconia may have a remaining portion of aluminum, cobalt, and manganese and, for example, is 69.0 wt % or more and 94.4 wt % or less.

The sintered body can include aluminum, cobalt, and manganese as an aluminum oxide, a cobalt oxide, and a manganese oxide, respectively. Alumina ($Al_2O_3$) is listed as the aluminum oxide. As the cobalt oxide, at least one of a cobalt oxide (II)(CoO) or a cobalt oxide (III)($Co_2O_3$) are listed. As the manganese oxide, at least one selected from a group of a manganese oxide (II)(MnO), a manganese oxide (III)($Mn_2O_3$), and a manganese oxide (IV)($MnO_2$) is listed.

The sintered body preferably contains a composite oxide containing aluminum, cobalt, and manganese; more preferably contains a composite oxide containing aluminum, cobalt, and manganese having a spinel structure, and still more preferably contains a cobalt aluminate substituted by manganese; and further still more preferably contains a composite oxide represented by at least one selected from a group of $Co(Al_{1-x}Mn_x)_2O_4$, $(Co_{1-x}Mn_x)(Al_{1-y}Mn_y)_2O_4$, and $(Co_{1-x}Mn_x)Al_2O_4$ (x, y are 0 or more and 1 or less respectively). Accordingly, even when a change in a sintering temperature for manufacturing the sintered body of the present embodiment is occurred (such as temperature unevenness of a sintering furnace), a change in the color tone is too small to confirm visually.

The sintered body may have a portion of each aluminum, cobalt, and manganese that is dissolved in yttria-containing zirconia.

The sintered body of the present embodiment preferably contains at least an aluminum oxide and a composite oxide containing aluminum, cobalt, and manganese having a spinel structure (hereafter, also referred to as "spinel oxide"), and more preferably contains crystal grains of zirconia, crystal grains of aluminum oxide, and crystal grains of the spinel oxide. Accordingly, in addition to an improved toughness function that zirconia has, surface boundaries between the crystal grains also tend to have improved toughness, and therefore the toughness of the sintered body can be expected to be higher.

The sintered body of the present embodiment may include impurities to an extent that the color tone is not affected. However, preferably, there are no impurities that affect the color tone of the sintered body. For example, at least one content selected from a group of tin, zinc, lead, chrome, and cadmium is 500 ppm or less, respectively, and preferably is 100 ppm or less.

An average crystal grain size of the sintered body of the present embodiment is no more than 2 μm, and more preferably no more than 1 μm. With the average crystal grain size being no more than 2 μm, sufficient strength is achieved to be used as a member for decorative materials and the like.

In the present embodiment, an average crystal grain size of zirconia can be obtained as an average value by randomly extracting at least 200 crystal grains of zirconia that is observed in an observation image by a scanning electron microscope (hereafter, referred to as "SEM") of the sintered body of the present embodiment, and the crystal size of the extracted crystal grains is obtained using an intercept method.

The sintered body has a maximum grain size of 30 μm or less preferably, and 10 μm or less more preferably.

A zirconia crystal structure of the sintered body of the present embodiment includes a tetragonal system and a main phase of the crystal structure is preferably tetragonal. Additionally, the zirconia crystal structure of the sintered body of the present embodiment may be a mixed crystal of the tetragonal system and a cubic system. The tetragonal system is the crystal structure that has optical anisotropy. By having the tetragonal system, light can be more readily reflected and therefore, the color tone of the sintered body has no transparency. In addition, by the presence of the crystal grains of aluminum oxide, the sintered body exhibits a clear dark gray color entirely. Further, the main phase of the zirconia crystal structure is tetragonal, thereby the sintered body of the present embodiment has high strength.

In the sintered body of the present embodiment, a relative density is at least 95.0%, preferably is 99.0% or more, and more preferably is 97.0% or more and 99.9% or less. As a measured density that corresponds to such a relative density, the measured density to be measured using a method according to JIS R 1634 is 5.40 g/cm$^3$ or more and 5.50 g/cm$^2$ or less, and more preferably 5.42 g/cm$^3$ or more and 5.48 g/cm$^3$ or less, for example.

The relative density can be obtained in a percentage (%) of the measured density (g/cm$^3$) with respect to a theoretical density (g/cm$^3$).

The color tone of the sintered body of the present embodiment preferably fulfills below as a lightness L*, a hue a*, and a hue b* in an L*a*b* color system.

Lightness L*: 60 or less, preferably 55 and less, and more preferably 52 or less Hue a*: $-1.5 \leq a^* \leq 1.5$, and preferably $-1.0 \leq a^* \leq 1.0$, and Hue b*: $-2.0 \leq b^* \leq 2.0$, and preferably $-1.5 \leq b^* \leq 1.5$ In particular, the color tone of the sintered body of the present embodiment preferably fulfills below as the lightness L*, the hue a*, and the hue b* in the L*a*b* color system.

Lightness L*: $42 \leq L^* \leq 60$, and preferably $42 \leq L^* \leq 52$

Hue a*: $-1.5 \leq a^* \leq 1.5$, and preferably $-1.0 \leq a^* \leq 1.0$, and

Hue b*: $-2.0 \leq b^* \leq 2.0$, and preferably $-1.5 \leq b^* \leq 1.5$

A sintered body of the present embodiment has a dark gray color tone, not in a color tone similar to the dark gray color, by not fulfilling one of the lightness L*, the hue a*, and the hue b*, but by fulfilling the lightness L*, the hue a*, and the hue b* noted above.

The color tone can be measured using a method according to JIS Z8722.

The sintered body of the present embodiment has color differences $\Delta E_1$ obtained from the following formula is 3.0 or less, and preferably 2.5 or less, and more preferably 1.5 or less. Accordingly, when sintering conditions (particularly calcination temperature) change, the change in the color tone is very small and the color tone change cannot be recognized visually.

$$\text{Color difference } \Delta_{E1} = \{(L_1^* - L_2^*)^2 + (a_1^* - a_2^*)^2 + (b_1^* - b_2^*)^2\}^{0.5} \quad \text{(Formula 1)}$$

In the formula noted above, $L_1^*$, $a_1^*$, and $b_1^*$ are respectively the lightness L*, the hue a*, and the hue b* of the sintered body that is sintered and obtained at the sintering temperature T1. $L_2^*$, $a_2^*$, and $b_2^*$ are respectively the lightness L*, the hue a*, and the hue b* of the sintered body that is sintered and obtained at the sintering temperature T2, and also T2 (° C.)=T1−20(° C.).

The sintered body of the present embodiment has color differences $\Delta E_2$ obtained from the following formula is 3.0 or less, and preferably 2.5 or less, and more preferably 1.5 or less. Accordingly, even when a design face is formed by fluctuating a grind depth from a surface of the sintered body, the change in the color tone is very small and such that the change is not recognized visually.

$$\text{Color difference } \Delta_{E2} = \{(L_3^* - L_4^*)^2 + (a_3^* - a_4^*)^2 + (b_3^* - b_4^*)^2\}^{0.5} \quad \text{(Formula 2)}$$

In the formula noted above, $L_3^*$, $a_3^*$, and $b_3^*$ are respectively the lightness L*, the hue a*, and the hue b* in a vicinity of the surface of the sintered body. $L_4^*$, $a_4^*$, and $b_4^*$ are respectively the lightness L*, the hue a*, and the hue b* of a ground surface by processing the sintered body by 0.4 mm toward an inner direction of the sintered body from the surface of the sintered body. The vicinity of the sintered body surface is a polished surface having a depth of 0.2 mm with respect to the surface of the sintered body after sintering (sintered body with a fired face).

When the sintered body containing the conventional colorant is visually observed, there are occasions where the color tone widely varies depending on the angle of the visual observation. However, it is preferred that the sintered body according to the present embodiment have smaller color tone differences when visually observed from different angles, i.e., that the color tone differences with reflecting lights of different angles be kept small. When the color differences are small, profoundness of the color tone is more likely increased in the sintered body according to the present embodiment.

For color differences, at least a difference of the hue a* and the hue b* between light receiving angles can be used as a parameter. For the sintered body according to the present embodiment having a gray color tone, it is preferred that differences of the hue b* between light receiving angles be used.

For the sintered body according to the present embodiment, the maximum value of $\Delta b^*$ obtained (hereinafter referred to as "$b^*_{MAX}$") from Formula 3 below is preferably 3.0 or less, and more preferably 1.0 or less. Also, for the sintered body according to the present embodiment, the maximum value of $\Delta a^*$ obtained (hereinafter referred to as "$a^*_{MAX}$") from Formula 4 below is preferably 0.4 or less, and more preferably 0.3 or less. The lower limits of $\Delta a^*$ and $\Delta b^*$ are 0 or more respectively, and it means that there are no hue differences between the light receiving angles.

$$\Delta b^* = b^*_n / b^*_{(-70)} \quad \text{(Formula 3)}$$

$$\Delta a^* \leq a^*_n / a^*_{(-70)} \quad \text{(Formula 4)}$$

In each Formula above, $\Delta a^*$ and $\Delta b^*$ are hue differences of a* and b* between the light receiving angles respectively. $a^*_n$ and $b^*_n$ are hues of a* and b* with light receiving angles of one of: −70° or more and −20° or less; and 40° or more and 70° or less respectively. Further, $a^*_{(-70)}$ and $b^*_{(-70)}$ are hues of a* and b* of a light receiving angle of −70° respectively. $a^*_n$, $b^*_n$, $b^*_{(-70)}$, and $b^*_{(-70)}$ may be measured with the following conditions:

Light source: F2 light source

Incident angle: 10°

Light receiving angle: −70°~70°

Measured sample: (Shape) Plate shape of 50 mm×50 mm×3 mm (vertical, horizontal, thickness)

$Ra \leq 0.02$ (Surface roughness)

The sintered body according to the present embodiment preferably has a lower translucency than the zirconia sintered body not containing colorant, and also has a smaller value of $\Delta b^*$ than the zirconia sintered body not containing colorant.

In the sintered body of the present embodiment, three-point bending strength is 800 MPa or more and 1400 MPa or less, and preferably is 1000 MPa or more and 1300 MPa or less. Accordingly, the sintered body has a strength that can process appropriately and also has the strength that can be used for a main purpose that is required for aesthetics such as an exterior member and a decorative member. The three-point bending strength can be measured using a method according to JIS R 1601.

Next, a manufacturing method of the sintered body according to the present embodiment is described.

As long as the sintered body of the present embodiment has the above features, the manufacturing method may be any method. As a preferred manufacturing method of the sintered body of the present embodiment, the manufacturing method includes a molding process and a sintering process. The molding process molds a powder composition containing, in an oxide exchange, aluminum of 5.0 wt % or more and 30.0 wt % or less, cobalt of 0.1 wt % or more and 2.0 wt % or less, and manganese of 0.5 wt % or more and 7.0 wt % or less; and the remaining portion consisting of yttria-containing zirconia. The sintering process sinters a green body obtained in the molding process at a temperature of 1350° C. or more and 1550° C. or less.

As another form of the preferred manufacturing method, the manufacturing method includes the sintering process in which the green body including the powder composition containing, in the oxide exchange, aluminum of 5.0 wt % or more and 30.0 wt % or less, cobalt of 0.1 wt % or more and 2.0 wt % or less, and manganese of 0.5 wt % or more and 7.0 wt % or less; and the remaining portion consisting of yttria-containing zirconia is sintered at a temperature of 1350° C. or more and 1550° C. or less.

The composition of the powder composition provided in the molding process includes, in the oxide exchange, aluminum of 5.0 wt % or more and 30.0 wt % or less, cobalt of 0.1 wt % or more and 2.0 wt % or less, and manganese of 0.5 wt % or more and 7.0 wt % or less; and the remaining portion consisting of yttria-containing zirconia. The powder composition containing, in the oxide exchange, aluminum of 10.0 wt % or more and 25.0 wt % or less, cobalt of 0.2 wt % or more and 1.8 wt % or less, and manganese of 0.8 wt % or more and 6.0 wt/o or less; and the remaining portion consisting of yttria-containing zirconia having 2.0 mol % or more and less than 6.0 mol % is listed as a more preferred composition.

Each element of aluminum, cobalt, and manganese in the powder composition may be in a state of oxide or its precursor, and preferably, may be aluminum oxide powder, cobalt oxide powder, and manganese oxide powder, respectively. Further, in the powder composition, the maximum grain size of aluminum oxide, cobalt oxide, and manganese oxide is preferably 5 μm or less, and more preferably, 3 μm or less.

The maximum grain size is a maximum value of the grain size measured in a grain size distribution of a volume standard. The grain size distribution of the volume standard may be measured by using a laser diffraction type particle size distribution device.

The cobalt oxide powder is of cobalt oxide ($Co_3O_4$) or of a cobalt compound which is its precursor. As the cobalt oxide powder, at least one type of powder, selected from a group of cobalt oxide, cobalt hydroxide, cobalt nitrate, and cobalt chloride, is listed.

The manganese oxide powder is of manganese oxide ($Mn_3O_4$) or of a manganese compound which is its precursor. As the manganese oxide powder, at least one type of powder, selected from a group of manganese oxide, manganese hydroxide, manganese chloride, manganese nitrate, and manganese acetate, is listed.

The aluminum oxide powder is of alumina ($Al_2O_3$) or of an aluminum compound which is its precursor. As the aluminum oxide powder, at least one type of powder, selected from alumina, aluminum hydroxide, aluminum nitrate, and aluminum chloride, is listed. The aluminum oxide powder is preferably alumina powder, and more preferably α-alumina powder. BET specific surface area of the aluminum oxide powder is preferred to be 5 $m^2$/g or more and 20 $m^2$/g or less.

The invention provides a zirconia sintered body exhibiting a gray color imparting a profound impression despite of containing a large amount of alumina. Surprisingly, amounts of alumina of from about 5.0 wt % to about 30.0 wt %, more preferably about 11.0 wt % to about 25.0 wt % and most preferably about 13.0 wt % to about 23.0 wt %, based on the total weight of the sintered body can be included without sacrificing a gray color imparting a profound impression.

The yttria-containing zirconia powder is of zirconia powder containing 2.0 mol % or more and less than 6.0 mol %, and preferably contains 2.6 mol % or more and 3.4 mol % or less. BET specific surface area of yttria-containing zirconia powder is preferably 5 $m^2$/g or more and 20 $m^2$/g or less.

The yttria-containing zirconia powder may be mixed powder containing two or more types selected from the group of yttria-containing zirconia powder, yttria powder, and zirconia powder, and also may be mixed powder of the yttria powder and zirconia powder.

The powder composition can be obtained by mixing the yttria-containing zirconia powder, the aluminum oxide powder, the cobalt oxide powder, and the manganese oxide powder using any method. The mixing method is preferably a wet mixing, and at least one of a ball mill or a stirring mill is more preferable.

After sintering, in order for the colorant to be evenly dispersed, it is preferred that the aluminum oxide powder, cobalt oxide powder, and manganese oxide powder be first mill-mixed, and then be wet-mixed together with the yttria-containing zirconia powder. In a more preferred mixing method, the aluminum oxide powder, cobalt oxide powder, and manganese oxide powder be first mill-mixed until the maximum particle size of the same is 5 μm or less (more preferably, 3 μm or less), and then be wet-mixed together with the yttria-containing zirconia powder.

The molding method of the powder composition may be a method that can mold raw powder in a desired shape and at least a type can be listed as the molding method from a group of a mold pressing, a cold isostatic pressing, a extrusion molding, a sheet forming, a slip casting, and an injection molding.

As for the shape of the green body, at least one type comprising a group of a disk shape, a column shape, a plate shape, a spherical shape, and a substantially spherical shape can be exemplified. However, the shape of the green body may be any other desired shape in accordance with a given objective.

In the sintering process, the green body is sintered using a sintering temperature at 1350° C. or more and 1550° C. or less. In the present embodiment, cobalt oxide, aluminum oxide, and manganese oxide react to produce a cobalt aluminate spinel oxide in which a spinel oxide, especially manganese, has been substituted. On the other hand, when the sintering temperature exceeds the above noted range, the color tone change of the sintered body is increased due to a slight difference in the sintering conditions, and reproducibility of the color tone significantly is worsened. The sintering temperature is preferably at 1400° C. or more and 1500° C. or less.

The sintering method may be any method as long as the spinel oxide can be stably obtained, and at least one type comprising a group of an atmospheric pressure sintering, a hot pressing method, and a hot isostatic press method is listed. For the convenience, the sintering method is preferably an atmospheric pressure sintering, and the atmospheric pressure sintering in air atmosphere is more preferred. The atmospheric pressure sintering is a method of sintering by merely heating without applying an external force to the green body while sintering.

A sintering time can be defined a desired range in accordance with the sintering method and sintering temperature.

The sintering time can include, for example, 1 hour to no more than 5 hours, and preferably 2 hours to no more than 4 hours.

In the sintering process, a hot isostatic press process (hereafter, referred to as "HIP") may be performed to the sintered body after the atmospheric pressure sintering. Exemplary HIP conditions after the atmospheric pressure sintering can include under an argon or a nitrogen atmosphere, at 50 to 200 MPa, 1400° C. or more and 1550° C. or less, and 30 minutes to no more than 4 hours.

The manufacturing method of the present embodiment may include at least one of a polishing process that polishes the sintered body and a processing process that processes the shape. In the polishing process, the surface of the sintered body after sintering is polished. By polishing, the sintered body can be formed to have a surface state suitable for a targeted use such that a glossiness is imparted to the surface. The processing process processes the sintered body in a desired shape. Accordingly, the sintered body can be formed in a shape corresponding to the use. Either one of the polishing process and processing process may be first performed.

EXAMPLES

Hereafter, a detailed description of the present embodiment is given using working examples. However, the present embodiment is not limited to the following examples. A method for evaluation is described below.

Measurement of Color Tone

The color tone of the sintered body sample was measured by a method according to JIS Z8722. A generic spectrophotometer (model name: CM-700d, manufactured by Konica Minolta, Inc.) was used for the measurement. Measurement conditions are noted below.

Light source: F2 light source
View angle: 10°

A sample size of the sintered body was 20 mm diameter× 2.7 mm thickness, and the surface which was ground and polished from a fired surface by 0.2 mm was defined as a color tone evaluation surface. A color tone effective area, 100 mm in diameter, was used.

Color Differences

Color differences are measured by a method according to JIS Z8722. For the measurement, a common variation angle spectroscopy system (device name: GCMS-4 by Murakami Color Research Laboratory) was used. Measurement conditions are noted below.

Light source: F2 light source
Incident angle: 100
Light receiving angle: −70°~70°
Tilt angle: 0°

For the sintered body sample, a plate with a shape of 50 mm×50 mm×3 mm (vertical, horizontal, thickness), and a surface roughness (polished to Ra≤0.02) was used.

With the above measurement, $a^*_n$, $a^*_{(-70)}$, $b^*_n$, and $b^*_{(-70)}$ were obtained, and according to Formula 3 and Formula 4, $\Delta a^*$, $\Delta b^*$, $\Delta a^*_{MAX}$, and $\Delta b^*_{MAX}$ were obtained for each light receiving angle.

Three-Point Bending Strength

A bending test was measured by a three-point bending test according to JIS R 1601 "a test method for bending strength of fine ceramics". The measurements were performed ten times and the three-point bending strength was defined by the average value. The measurement was performed using the sintered body sample in the columnar shape having a 4 mm width and a 3 mm thickness with a distance between supporting points being 30 mm.

Sintered Body Density

A measured density of the sintered body is measured using a measuring method according to JIS R 1634 (measuring method of an open porosity and a sintered body density of fine ceramics). A relative density was from a ratio of the measured density with respect to a theoretical density. Prior to the measurement, after measuring the mass of the dried sintered body, the sintered body is placed in the water and a pretreatment was performed by boiling the sintered body for one hour.

Average Crystal Grain Size

The average crystal grain size of the zirconia crystal grain (sintered body sample) was measured using an intercept method. The sintered body sample after mirror polishing was heat-etched and the surface of the sintered body sample was observed using a scanning microscope at 20,000 times magnification. The average grain size of the zirconia crystal grain was measured from the obtained SEM observation image using the intercept method (k=1.78). The number of zirconia crystal grains that was measured was set 200 or more.

Elemental Analysis by EPMA

The surface analysis was performed on the sintered body sample using a wavelength dispersion type electron prove micro analyzer (EPMA) (device name: EPMA1610 manufactured by Shimadzu corporation). Measurement conditions are noted below.

Acceleration voltage: 15 KV
Irradiation current: 100 nA

Maximum Particle Size

For measuring the maximum particle size of the powdered sample, a common laser diffraction type particle size distribution device (device name: 930-HRA by HANEWELL) was used. Measurement conditions are noted below.

Approximation of sample shape: spherical shape approximation
Refractive index of solvent: 1.33
Refractive index of powdered sample: 2.17

The maximum value of the measured particle size was determined as the maximum particle size. For the measured sample, slurry including the powdered sample was used, and, as preprocessing, the slurry was irradiated with ultrasound for 3 minutes.

Example 1

3 mol % of yttria-containing zirconia powder (BET specific surface area: 6.8 m²/g manufactured by Tosoh corporation), high purity alumina powder (manufactured by Sumitomo Chemical Co., Ltd.), cobalt oxide ($Co_3O_4$) powder (manufactured by Kishida Chemical Co., Ltd.) and manganese oxide powder (manufactured by Tosoh Hyuga Corporation) were wet-mixed to obtain mixed powder having the following composition. The mixed powder was dried in the air at 100 to 130° C. Wet mixing was performed as follows. First, pure water was added to high purity alumina powder, cobalt oxide powder, and manganese oxide powder to make slurry, and the slurry was processed in a ball mill while checking the particle size. Next, after confirming that the maximum particle size of the powder inside the slurry is 3 μm or less, the slurry and 3 mol % of the yttria-containing zirconia powder are processed in the ball mill.

$Al_2O_3$: 20 wt %
$Co_3O_4$: 0.45 wt %
$Mn_3O_4$: 1.9 wt %

ZrO$_2$ containing 3 mol % of Y$_2$O$_3$: remaining portion

The molded body is obtained by molding the dried mixed powder by uniaxial pressing of 1000 kg/cm$^2$. The atmospheric pressure sintering is performed on the green body at one of the following sintering temperatures and three sintered bodies of the present example were obtained.

Sintering conditions are noted below.
Sintering atmosphere: Air atmosphere
Sintering temperature: One of 1430° C., 1450° C., or 1470° C.
Rate of temperature increase: 100° C./hour
Sintering time: Two hours All the sintered bodies of the present example include, in the oxide exchange, 20 wt %/o of aluminum, 0.45 wt % of cobalt, 1.9 wt % of manganese; and the remaining portion consisting of yttria-containing zirconia of 3 mol % yttria content. The average crystal grain size of the sintered body obtained at a sintering temperature of 1450° C. was 0.63 µm.

After observing visually each of the surfaces of the obtained sintered body (fired surface) and a surface after polishing the fired surface by 0.2 mm (polished surface), both surfaces exhibited a heavy dark gray color. In addition, the color differences ΔE$_1$ of the polished surfaces of the obtained three sintered bodies is 0.19 to 0.98 and no difference in color tone was observed visually.

Example 2

Using a similar method to Example 1 except that the mixed powder was formed with the following composition, three sintered bodies of the present example were obtained.
Al$_2$O$_3$: 20 wt %
Co$_3$O$_4$: 0.35 wt %
Mn$_3$O$_4$: 1.55 wt %
ZrO$_2$ containing 3 mol % of Y$_2$O$_3$: remaining portion All the sintered bodies of the present example include, in the oxide exchange, 20 wt % of aluminum, 0.35 wt % of cobalt, 1.55 wt % of manganese; and the remaining portion consisting of yttria-containing zirconia of 3 mol % yttria content.

After observing visually each of the surfaces of the obtained sintered bodies (fired surface) and the surfaces after polishing the fired surface by 0.2 mm (polished surface), all surfaces exhibited a heavy dark gray color. In addition, the color differences ΔE$_1$ of the polished surfaces of the obtained three sintered bodies are 0.21 to 0.56 and no difference in color tone was observed visually.

Example 3

Using a similar method to Example 1 except that the mixed powder was formed with the following composition, three sintered bodies according to the present example were obtained.
Al$_2$O$_3$: 20 wt %
Co$_3$O$_4$: 0.40 wt %
Mn$_3$O$_4$: 1.8 wt %
ZrO$_2$ containing 3 mol % of Y$_2$O$_3$: remaining portion All the sintered bodies of the present example include, in the oxide exchange, 20 wt % of aluminum, 0.40 wt % of cobalt, 1.8 wt % of manganese; and the remaining portion consisting of yttria-containing zirconia of 3 mol % yttria content.

After observing visually each of the surfaces of the obtained sintered bodies (fired surface) and the surfaces after polishing the fired surface by 0.2 mm (polished surface), all surfaces exhibited a heavy dark gray color. In addition, the color differences ΔE$_1$ of the polished surfaces of the obtained three sintered bodies are 0.58 to 0.61 and no difference in color tone was observed visually.

Microstructure Composition Analysis

Figure 1:
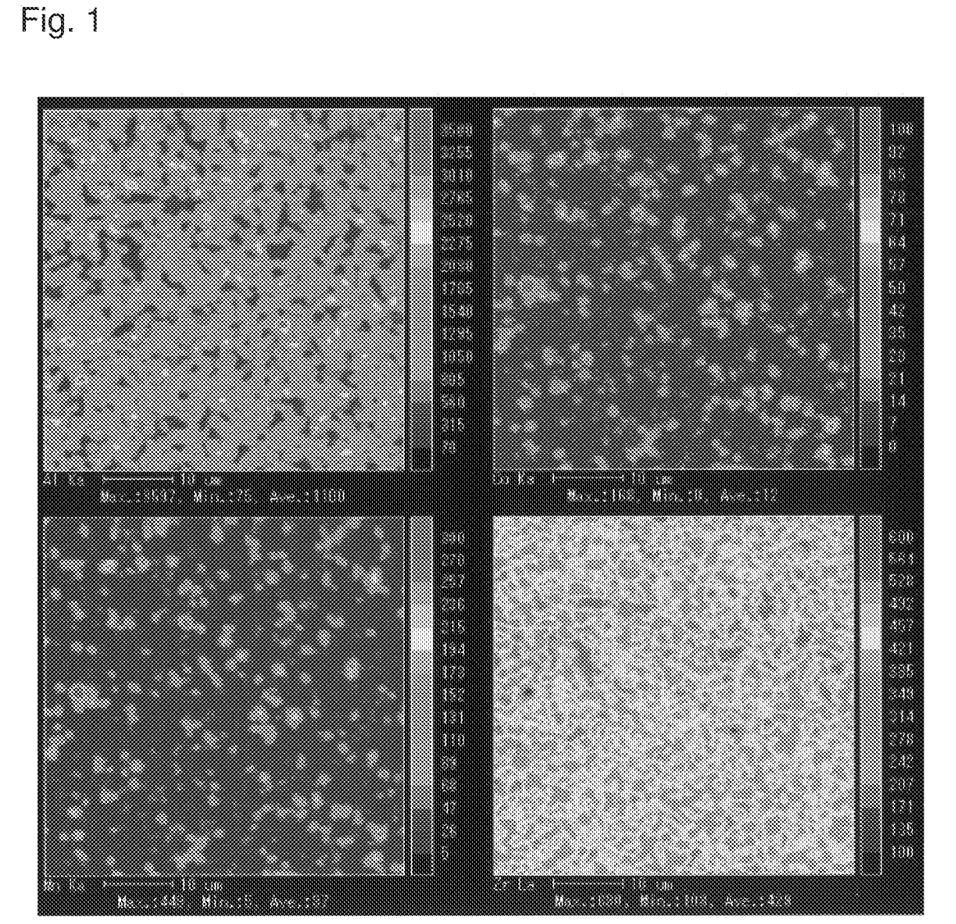
FIG. 1 shows a result of an EPMA composition analysis of a sintered body in Example 3: (a) Al mapping, (b) Co mapping, (c) Mn mapping, and (d) Zr mapping.

Results of EPMA analysis of the sintered body obtained at the sintering temperature of 1450° C. are illustrated in FIG. 1. As shown in FIG. 1, the sintered body is observed having a region where AL exists and a region where Al, Co, and Mn overlap, and aluminum compound and composite oxide of aluminum, cobalt, and manganese can be confirmed.

Given these results, the sintered body of the present example can be confirmed to include a cobalt aluminum composite oxide having a spinel structure and in which Mn has been substituted, and an aluminum oxide.

Figure 2:
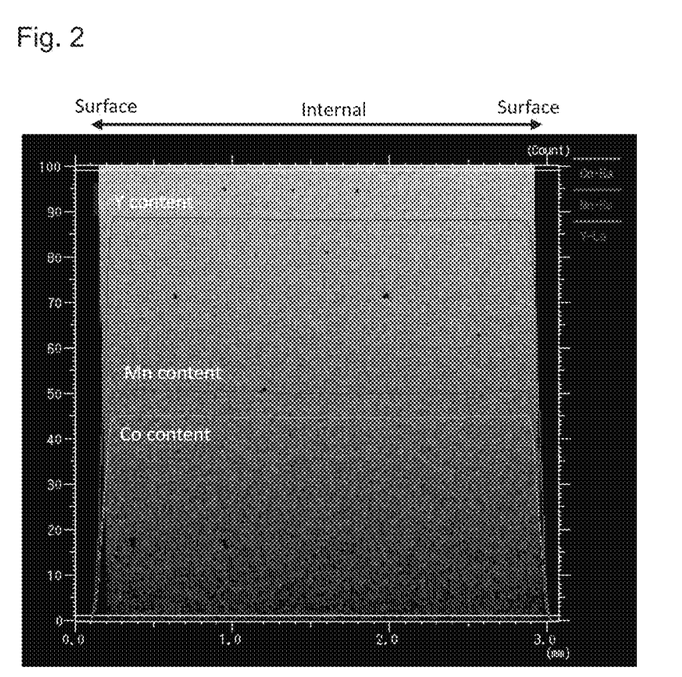
FIG. 2 is a result of an elemental analysis of the sintered body shown in Example 3.

A cross section of the sintered body of the present example was examined by the SEM observation and the elemental analysis. The result is shown in FIG. 2. From the result of the SEM observation, crystal grains of alumina were confirmed inside the sintered body, and from the result of the elemental analysis, Al, Co, and Mn ratio (concentration) contained on the surface and inside of the sintered body was confirmed to be similar. Accordingly, it was possible to confirm that the sintered body according to the present example was generally evenly distributed.

Example 4

Using a similar method to Example 1 except that the mixed powder was formed with the following composition, three sintered bodies according to the present example were obtained.
Al$_2$O$_3$: 18.5 wt %
Co$_3$O$_4$: 1.75 wt %
Mn$_3$O$_4$: 6.0 wt %
ZrO$_2$ containing 3 mol % of Y$_2$O$_3$: remaining portion All the sintered bodies of the present example include, in the oxide exchange, 18.5 wt % of aluminum, 1.75 wt % of cobalt, 6.0 wt % of manganese; and the remaining portion consisting of yttria-containing zirconia of 3 mol % yttria content.

After observing visually each of the surfaces of the obtained sintered bodies (fired surface) and the surfaces after polishing the fired surface by 0.2 mm (polished surface), all surfaces exhibited a heavy dark gray color which is extremely close to black. In addition, the color differences ΔE$_1$ of the polished surfaces of the obtained three sintered bodies are 0.37 to 0.71 and no difference in color tone was observed visually.

Given these results, even though the sintered body of the present example includes a large amount of alumina, there was no change in the color tone substantially due to the sintering temperature. Results are given in the following table.

TABLE 1

| | Sintering temperature (° C.) | Relative density (%) | Measured density (g/cm$^3$) | Color tone | | |
|---|---|---|---|---|---|---|
| | | | | L* | a* | b* |
| Example 1 | 1470 | 99.9 | 5.460 | 46.61 | −0.16 | 0.12 |
| | 1450 | 99.9 | 5.460 | 48.40 | −0.28 | −0.54 |
| | 1430 | 99.8 | 5.454 | 48.56 | −0.37 | −0.48 |
| Example 2 | 1470 | 99.9 | 5.471 | 49.14 | 0.18 | −0.39 |
| | 1450 | 99.9 | 5.471 | 49.33 | 0.10 | −0.32 |
| | 1430 | 99.8 | 5.468 | 49.82 | −0.15 | −0.21 |

TABLE 1-continued

|  | Sintering temperature (° C.) | Relative density (%) | Measured density (g/cm³) | Color tone L* | a* | b* |
|---|---|---|---|---|---|---|
| Example 3 | 1470 | 99.9 | 5.461 | 48.79 | 0.07 | −0.31 |
|  | 1450 | 99.9 | 5.460 | 49.34 | −0.09 | −0.23 |
|  | 1430 | 99.8 | 5.455 | 49.91 | −0.24 | −0.08 |
| Example 4 | 1470 | 99.9 | 5.443 | 43.79 | −1.17 | 0.12 |
|  | 1450 | 99.9 | 5.442 | 43.93 | −0.94 | −0.13 |
|  | 1430 | 99.9 | 5.440 | 44.25 | −1.43 | −0.53 |

Color Tone Evaluation of Ground Surface

In Examples 1 to 3, three-point bending strength was measured for the sintered body obtained by sintering at a sintering temperature of 1450° C. In addition, the surface of each of these sintered bodies was ground by 0.4 mm from the surface in a thickness direction to obtain the ground surface. Color differences between the ground surface and a surface prior to grinding (polished surface) are shown below.

TABLE 2

|  | Color tone of surface (polished surface) | | | Color tone of ground surface | | | Color difference | Three-point bending strength |
|---|---|---|---|---|---|---|---|---|
|  | L* | a* | b* | L* | a* | b* | $\Delta E_2$ | (MPa) |
| Example 1 | 48.40 | −0.28 | −0.54 | 49.45 | −0.35 | −0.75 | 1.10 | 1214 |
| Example 2 | 49.33 | 0.10 | −0.32 | 50.32 | −0.04 | −0.65 | 1.05 | 1086 |
| Example 3 | 49.34 | −0.09 | −0.23 | 50.70 | −0.41 | −0.40 | 1.41 | 1102 |

As shown in Table 2, the color differences $\Delta E_2$ before and after a grinding process is 1.5 or less and the change in the color tone could not be confirmed visually. Accordingly, although the sintered bodies of the example include the large amount of alumina, both the surface and an internal portion can exhibit similar dark gray colors. All the sintered bodies have the maximum grain size of 6 μm or less, and the three-point bending strength is also 1000 MPa or more and about 1250 MPa, and the sintered body can be confirmed having a strength appropriate for processing.

Measurement of Color Differences

The following table shows measurement results of color differences of sintered bodies sintered according to Example 1, Example 3, as well as Comparison Example (for comparison, using a method similar to the embodiment, with 3 mol % of yttria-containing zirconia powder).

TABLE 3

|  | Δa* Maximum value (measured light receiving angle) | Δb* Maximum value (measured light receiving angle) |
|---|---|---|
| Example 1 | 0.14 (−25°) | 0.52 (40°) |
| Example 3 | 0.20 (−20°) | 0.84 (−20°) |
| Comparison Example | 0.42 (−20°) | 1.18 (−20°) |

The sintered body according to the embodiment has the maximum value of Δb* below 1.00 and the maximum value of Δa* being 0.20 or less. It was confirmed that, even when the sintered body was viewed from different angles, the color differences were not shown and similar color tones were visually recognized from every angle. Further, it was confirmed that the sintered body according to the embodiment has smaller color tone differences as compared to the sintered body consisting of zirconia only, even though the sintered body of the present embodiment contains colorant. Accordingly, the sintered body according to the embodiment is considered to have inhibited translucency deriving from zirconia.

Further, the following table shows Δb* with typical light receiving angles according to Example 1, Example 3, as well as Comparison Example.

TABLE 4

| Light receiving angle | Example 1 | Example 3 | Comparison Example |
|---|---|---|---|
| −60° | 0.07 | 0.16 | 0.16 |
| −40° | 0.11 | 0.18 | 0.53 |
| −20° | 0.10 | 0.84 | 1.18 |
| 50° | 0.16 | 0.14 | 0.05 |
| 70° | 0.08 | 0.00 | 0.14 |

From the above table, it is understood that the zirconia sintered body according to the Comparison Example has a wide range of Δb* values for each light receiving angle, and, depending on the observing angle of the sintered body, the visually recognized color tone varies significantly. On the other hand, according to Example 1, Δb* value when the light receiving angle is −20° (while $\Delta b^*_{MAX}$ was observed in the Comparison Example) is smaller, and it was confirmed that the range of variance of Δb* value for each light receiving angle is small. Accordingly, it is understood that, even when the sintered body of the Example 1 is viewed from different angles, relatively similar color tones are visually recognized from different angles.

The zirconia sintered body according to the present embodiments can be provided with a high density and a heavy dark gray color, and with an excellent aesthetic appearance exhibiting a stable hue even when deteriorated by use. The zirconia sintered body can be used for jewelry items with a luxury look which is unlikely to be damaged, a member such as a decorative member, and various members such as watch parts, exterior parts of a portable electronic device, and the like, for example.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A zirconia sintered body comprising aluminum, cobalt, and manganese and a remaining portion consisting of yttria-containing zirconia, wherein, in an oxide exchange, aluminum content is 5.0 wt % or more and 30.0 wt % or less, cobalt content is 0.1 wt % or more and 2.0 wt % or less, and manganese content is 0.5 wt % or more and 7.0 wt % or less.

2. The zirconia sintered body according to claim 1, wherein yttria content in the yttria-containing zirconia is 2.0 mol % or more and less than 6.0 mol %.

3. The zirconia sintered body according to claim 1 which comprises an aluminum oxide and a composite oxide that contains aluminum, cobalt, and manganese having a spinel structure.

4. The zirconia sintered body according to claim 1, wherein a lightness L*, a hue a*, and a hue b* in an L*a*b* color system fulfill the following:
Lightness L*: 60 or less
Hue a*: $-1.5 \leq a^* \leq 1.5$, and
Hue b*: $-2.0 \leq b^* \leq 2.0$.

5. A method of manufacturing the zirconia sintered body according to claim 1, comprising:
- a molding process that molds a powder composition containing, in the oxide exchange, aluminum of 5.0 wt % or more and 30.0 wt % or less, cobalt of 0.1 wt % or more and 2.0 wt % or less, and manganese of 0.5 wt % or more and 7.0 wt % or less, and a remaining portion consisting of yttria-containing zirconia; and
- a sintering process that sinters a green body obtained in the molding process at a temperature of 1350° C. or more and 1550° C. or less.

6. A powder composition containing, in the oxide exchange, aluminum of 5.0 wt % or more and 30.0 wt % or less, cobalt of 0.1 wt % or more and 2.0 wt % or less, and manganese of 0.5 wt % or more and 7.0 wt % or less; and a remaining portion consisting of yttria-containing zirconia.

* * * * *